Jan. 3, 1933.     J. W. SWENDSEN     1,893,112
INDUCTION MOTOR WITH SHORT CIRCUITED SECONDARY
Filed March 10, 1930     3 Sheets-Sheet 1
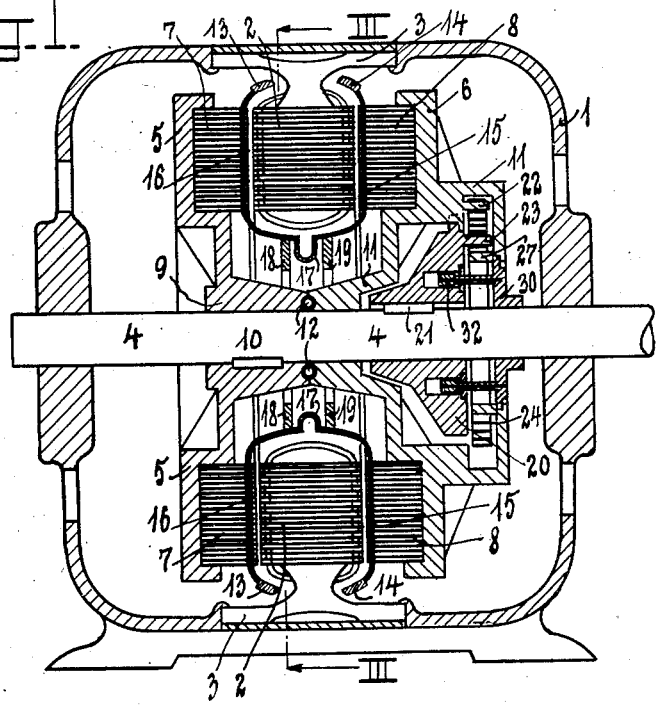
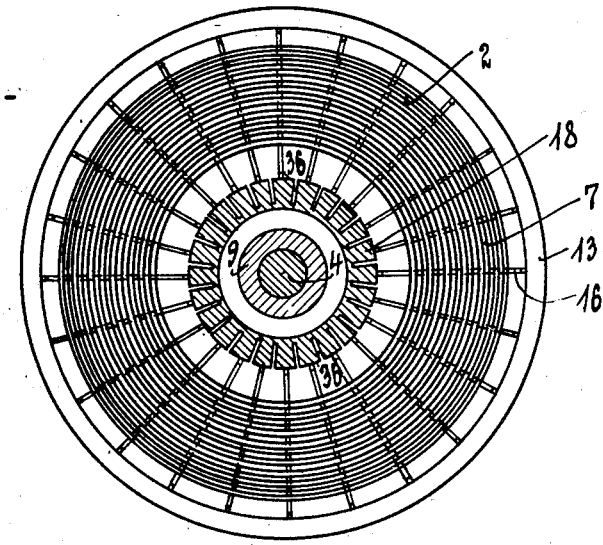
J. W. Swendsen
INVENTOR
By: Marks & Clerk
Attys.

Jan. 3, 1933.    J. W. SWENDSEN    1,893,112
INDUCTION MOTOR WITH SHORT CIRCUITED SECONDARY
Filed March 10, 1930    3 Sheets-Sheet 2
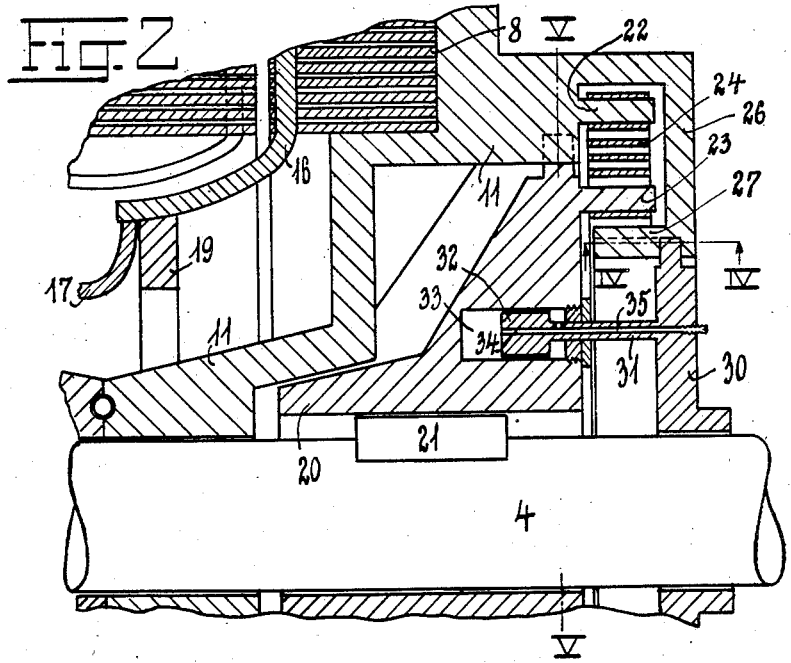
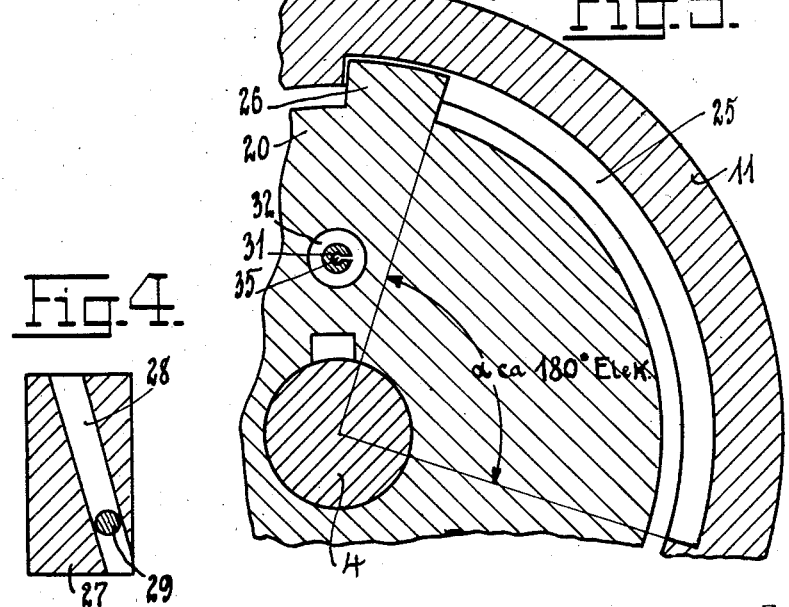
J. W. Swendsen
INVENTOR Jan. 3, 1933.  J. W. SWENDSEN  1,893,112
INDUCTION MOTOR WITH SHORT CIRCUITED SECONDARY
Filed March 10, 1930  3 Sheets-Sheet 3
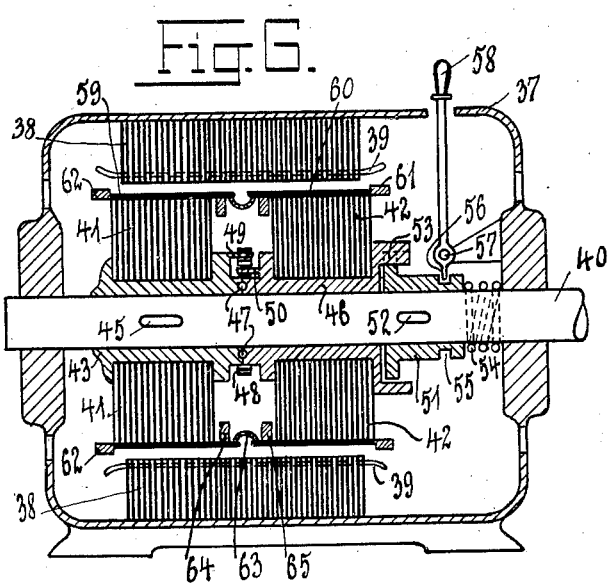
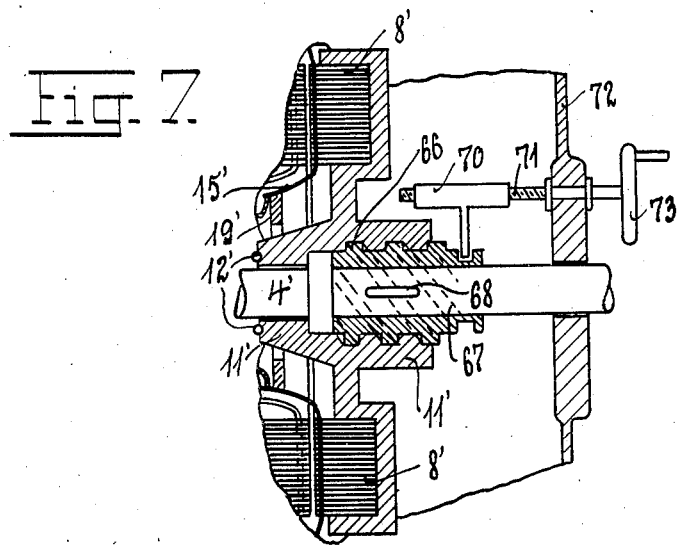
J. W. Swendsen
INVENTOR
By: Marks & Clerk
ATTYS.

Patented Jan. 3, 1933

1,893,112

UNITED STATES PATENT OFFICE

JOHAN WALFRED SWENDSEN, OF OSLO, NORWAY

AN INDUCTION MOTOR WITH SHORT-CIRCUITED SECONDARY

Application filed March 10, 1930, Serial No. 434,699, and in Germany March 12, 1929.

The present invention relates to an induction motor with short-circuited secondary, and its object is to produce a short-circuit motor which can be started without auxiliary apparatus as transformers and the like.

According to the present invention, the secondary magnetic element of the motor is divided in two parts, which can be twisted in relation to each other around the axis of the motor for the purpose of establishing a phase angle between the two parts of the short-circuited bars.

One of the said parts of the secondary element may be rigidly attached to the shaft of the motor, while the other part is free to move around the shaft within a certain predetermined angle.

Means may further be provided to twist the two parts in relation to each other when the motor is at rest, thus always adjusting the motor to be in proper starting position.

As soon as power is applied to the motor, a torque will be established which will tend to twist the loose part of the secondary in line with the part of the secondary which is attached to the shaft. According to this invention, means as for instance a frictional clutch, centrifugal weights, screws or the like are provided which will control the twisting of the loose part of the secondary to take place in a predetermined time period, in such a way that the time which will elapse from the time power is applied until the time when the motor is running with full speed, will be the correct time under the given circumstances.

As will be understood by anybody, each of the secondary elements will be provided with short-circuited bars, electrically connected to corresponding bars in the other element. Between the bars in each element, at or near the point where these bars are electrically connected to the bars in the other element, a suitable resistance ring may be provided, which ring will serve as a resistance element, and when the two secondary elements are twisted in relation to each other, will complete the secondary circuit individually for each of the secondary elements, thus giving the motor a characteristic of a slip ring induction motor with two secondary windings. Under these circumstances practically no secondary power will flow from one part to the other of the secondary element.

As soon as the motor has started and attained normal running speed, and as soon as the loose parts of the secondary element have been twisted in phase with the part fixed to the shaft, the above mentioned resistance rings will have performed their service, and there will only be one secondary winding, the secondary power flowing from the one secondary element through the electrical connections over into the other and back again. The characteristic of the motor will then be that of an ordinary squirrel cage induction motor with short-circuited secondary.

According to this invention, the resistance elements between the secondary bars can further be used for continuous service in the same way as the auxiliary resistance which is usually combined with the slip ring motor, means then being provided for adjusting the loose part of the secondary to maintain a given phase displacement in space in relation to the part of the secondary which is rigidly attached to the shaft.

In order that the invention may be easily understood, some preferred embodiments of the same are illustrated in the drawings as examples only.

Fig. 1 illustrates a cross section through a short-circuit motor with strip wound stator and two strip wound rotor elements.

Fig. 2 is a fractional cross section to a larger scale, illustrating a frictional clutch which can be used in connection with the motor shown in Fig. 1.

Fig. 3 is a view illustrating one of the rotor elements, seen in the direction indicated by the arrows III—III in Fig. 1.

Fig. 4 is a cross section through a detail on the line IV—IV in Fig. 2.

Fig. 5 is a fractional cross section on the line V—V in Fig. 2.

Fig. 6 is a cross section through a cylinder type motor according to this invention.

Fig. 7 is a fractional cross section illustrating a modification of the motor illustrated in Fig. 1.

In Figs. 1–5 the motor consists of a frame 1, in which the strip wound stator 2 is mounted by means of legs 3. Preferably the stator core is made by winding a continuous sheet iron ribbon into a spiral. In the frame 1 a shaft 4 is mounted. The shaft 4 carries the rotor, which comprises two disk shaped elements 5 and 6, each of which is provided with strip wound magnetic elements 7 and 8. The core 7 is supported by means of the hub 9, which is rigidly attached to the shaft by means of a key 10. The core 8 is mounted on the hub 11, which is turnably mounted on the shaft 4. The hubs 9 and 11 abut against each other, and in order to eliminate the friction between them, when they are forced against each other due to the magnetic force, a frictional reducing arrangement, as for instance balls 12 are mounted between their ends. The short-circuiting winding on the secondary consists of short-circuiting rings 13 and 14, arranged outside the periphery of the stator windings. These rings are electrically connected with each other by means of bars 15, 16, which on the inner side are bent in towards each other in close relation to the inner side of the stator winding. Each pair of short-circuiting bars 15, 16 are connected with each other by means of flexible copper conductors or pig tails 17 and at the same time the copper bars of each rotor element are connected with each other by means of rings 18 and 19 on the inside of the stator.

As will be easily understood, the rotor elements 6 may thus be twisted in relation to the rotor element 5 without breaking the electrical connection between the pairs if bars 15 and 16.

In Fig. 2 one embodiment of the mechanism which may be utilized to control the angular position of the rotor half 6 in relation to the rotor half 5 is illustrated on a larger scale. This mechanism is constructed in such a way that the rotor element 6 will be twisted to a definite position (the starting position) when no power is applied to the motor, and the mechanism will further control the movement of the rotor half from the starting position to the running position after the time when power is applied to the stator.

In the drawings, the mechanism primarily consists of the conical frictional clutch 20, which is axially, but not turnably moveable on the shaft 4, a key 21, being provided on the shaft which will allow the clutch 20 to move back and forth in the axial direction. The moveable part of the clutch corresponds in shape and angle to a conical recess in the hub 11 in such a way that the magnetic element 8 on the rotor half 6 will be fixed to the shaft 4 by means of the clutch, when this is moved to the left.

The hub 11 is provided with a rod-like projection 22 which is radially disposed outside and adjacent to a corresponding rod-like projection 23 on the clutch member 20, to which projections the two ends of a spiral spring 24, arranged around the shaft, are attached.

The hub 11 is further provided with an internal curved groove 25, the length of which preferably may be chosen to be 180 electrical degrees of the stator winding. A projection 26 on the clutch element 20 is received in the groove 25, thus controlling the movement of the rotor element 6 respectively the hub 11 in relation to the clutch 20. When the clutch 20 is detached from the hub 11 and power is not applied to the stator, the spring 24 will move the hub 11 with the magnetic element 8 to the position illustrated in Fig. 5 of the drawing, or in other words to the starting position. In this position the bars in the two rotor elements will be displaced 180 electrical degrees in relation to each other. At the right end of the hub 11 a plate 26' is provided, which projects inwardly towards the shaft and has a cylindrically shaped projection 27 extending towards the clutch element 20. The cylinder 27 is provided with a groove 28 which receives a projection 29 on a disk 30, which is turnably and slideably mounted on the shaft 4. The groove 28 will in connection with the projection 29 work as a positive cam. The plate 30 carries piston rods 31, to the end of which pistons 32 are attached, which are received in cylinders 33 in the clutch 20. The cylinders 33 can be air cushion cylinders or dash pots or they may contain any kind of fluid.

A channel 34 is provided in the piston 32, establishing a pathway between the two sides of the piston. In order to adjust this pathway, a screw 35 is arranged in the piston rod and projects outside the plate 30, whereby it is possible to regulate the friction by which the fluid is met when passing from the inside to the outside of the piston or vice versa.

The clutch arrangement above described will work in the following manner:

When power is applied to the stator, the secondary of the motor and thus also the shaft will start to rotate, and due to the fact that the loose half of the rotor does not pull as heavy a load as the rigid half of the rotor, the first mentioned half necessarily will have a tendency to run faster than the latter.

In Fig. 5 the rotating direction is indicated by an arrow. Due to this relative movement between the loose rotor half on the one side and the shaft and the clutch 20 on the other side, the projection 29 will slide in the groove 28, and the disk 30 thus will be forced towards the left as illustrated in Figs. 1 and 2. This movement of the disk 30 towards the left will establish a pressure on the clutch 20 through the medium of the piston or pistons 32, and the clutch will come into frictional contact with the hub 11 and retard its movement. The fluid presure on the inside of the piston 32 will, however, very quickly be reduced due to the fact that the fluid can flow through the channel 34 and on the outside of the piston. The clutch 20 thus will immediately be loosened, and the hub 11 with the rotor element 8 can again move faster than the shaft. The same operation will be repeated. The disk 30 will be moved towards the left, and the clutch 20 will retard the further movement of the hub 11.

This operation will be continued, until the rotor element 8 on the hub 11 has been twisted to assume a position in phase with the rotor element 7. In this position the projection 26 will abut against the other end of the groove 25 in the hub 11. The above mentioned movements have taken place against the action of the spring 24, and as soon as the power is taken off the motor, the spring will move the hub 11 with the rotor element 8 back into starting position as shown in Fig. 5.

At or close to the inside end, where the bars 15 and 16 meet on the inside of the stator, and where they are interconnected by means of a flexible lead 17, each of the short-circuiting bars of each rotor half is connected with each other by means of rings 18 and 19, which between each pair of bars are provided with slots 36. When power is applied to the stator and the two rotor halves are displaced 180 electrical degrees in relation to each other, the secondary current will flow in two separate paths, one in each of the two rotor elements. By means of the slots 36 a suitable resistance is established between the bars of each rotor half, and this resistance can by suitable dimensions and by choosing a suitable depth of the slots 36 be regulated in such a way that the inrushing current can be limited to a degree which is permissible in the locality where the motor is going to be used. Thus the motor will be started as an induction motor, having the characteristics of a slip ring motor with two independent secondary circuits. When the loose rotor half as above described has been adjusted in phase with the other half of the rotor, no current will flow through the rings 18 and 19, but the current will flow from one rotor half to the other, and the characteristic of the motor will be that of an ordinary induction motor with short-circuited secondary.

In Fig. 6 another embodiment of the invention is shown. Here the invention is applied to an ordinary motor of the cylinder type. In Fig. 6 the motor has a frame 37, supporting a stator 38 with windings 39. In the frame a shaft 40 is further mounted, on which a cylinder type rotor, consisting of two parts 41 and 42, is arranged. The rotor element 41 is fixed to the shaft 40 by means of a hub 43 and a key 45, and the rotor element 42 is fixed on a hub 46, which is free to rotate on the shaft 40. Where the two hubs meet in the center of the motor, a ball bearing 47 is arranged, which will prevent undue friction between the two parts. The two hubs are further interconnected by means of a spiral spring 48, which on the one side is fastened to the hub 43 by means of a projection 49, and on the other side to the rotatable hub 46 by means of a projection 50. In the same way as described in connection with the previous example, this spring serves to hold the two rotor elements in a certain fixed position in relation to each other, when power is not applied to the motor. On the shaft 40 a clutch 51 is arranged, slidably in the axial direction, but fixed to the shaft by means of a key 52, so that it cannot rotate on this. A clutch 51 is pressed against the hub 46 by means of a coil spring 54 and a projection on the clutch 51 is received in a groove in the hub 46 and serves to control the maximum angular displacement of the hub 46 in relation to the hub 43. The clutch 51 further has an annular groove 55, into which a bifurcated lever 56 projects. This lever is pivotally fastened to the frame at a point 57 and has an extension 58, projecting outside the frame 37. By means of the extension 58 and the bifurcated arm 56, the clutch 51 can be pulled out of engagement with the hub 46. The rotor elements 51 and 52 are provided with short-circuiting bars 59 and 60 respectively, which at the ends of the motor are connected with each other by means of short-circuiting rings 61, 62. At the middle point of the motor, where the short-circuiting bars of the two rotor elements are closed together, they are electrically connected with each other by means of a flexible lead 63 and are further interconnected with all the other bars in the same rotor element by means of short-circuiting rings 64, 65, corresponding to the rings 18 and 19 in Fig. 1.

When the motor is started, the rotor 42 has a certain angular relation to the rotor 41, this angle being at a maximum 180 electrical degrees. When power is applied to the stator, each of the rotor elements will act as a separate slip ring rotor, having a suitable resistance in the circuit, this resistance being represented by the resistance in the rings 64, 65. When the motor has attained a suitable speed, the handle 58 is moved to the left, whereby the rotor element 42 is allowed to slip on the clutch 51 and by and by to assume a position in phase with the rotor element 41, the short-circuiting bars 60 and 59 then being in line with each other. When this has happened, the motor will run as an ordinary induction motor with short-circuited secondary.

While moving from the position out of the angle with the rotor element 41, the rotor element 42 will overcome the action of the spring 48, and when the motor is stopped and the handle 58 is moved to the left, the spring 48 will reset the rotor element 42 in relation to the element 41 in order to make the motor ready for a new start. It will of course be understood by anybody skilled in the art that the clutch arrangement described in connection with Fig. 6 can be interchanged with that illustrated and described above and vice versa.

In Fig. 7 another embodiment of regulating mechanism for the relative position of the rotor elements is shown. In this figure, the hub 11' is provided with steep internal threads 66, adapted to receive a corresponding screw 67, which can slide, but not turn on the shaft 4', being attached to this by means of a key 68. At the outer end, the screw bushing has an annular groove, adapted to receive a fork 69, which is provided with a threaded sleeve 70. A screw 71 passes through the frame 72 of the motor, and its threads are in engagement with the internal threads of the sleeve 70. On the outside of the frame 72, a screw 71 is provided with a handle wheel 73. When it is desired to adjust the rotor element 8' in relation to the rotor element which is fixed to the shaft 4', the hand wheel 73 is turned. The fork 69 will thus be moved towards the left, and the bushing 67 will have to move in the same direction. This movement will be transmitted to the rotor element 8' in the form of a twisting movement in such a way that its angular position in relation to the other rotor half will be changed.

If suitable ventilation facilities are at hand to cool the short-circuiting rings 19', it is thus possible to regulate the speed of an induction motor with short circuited secondary in the same way as at an ordinary slip ring motor, with the difference that in this case it is not necessary to have auxiliary resistance elements.

It will be understood by anybody that this invention is not limited to the details described in the foregoing, which details are only described in order to make the invention easily understood and worked.

I claim:

1. An induction motor with short-circuited secondary, comprising a shaft, two electrically interconnected rotor elements rotatably mounted in relation to each other upon the shaft and with a restricted angle of movement, abutments on the shaft and on one or both of said elements to limit the movement of one element in relation to the other, means including a spiral spring to hold the rotor elements in maximum angular displacement in relation to each other when the motor is idle, the rotor elements due to magnetic action overcoming the strength of the spring and moving into phase relation to each other when power is applied to the motor and the shaft is under load.

2. A motor as claimed in claim 1 wherein one of the rotor elements is fixed to the shaft and the other is free to turn thereon, a friction clutch on the shaft to retard the rotational movement of the loose rotor element relative to the fixed element.

3. An induction motor with short-circuited secondary, comprising a shaft, two electrically interconnected rotor elements on the shaft, one being fixed on the shaft and the other loose thereon and being free to turn thereon within certain limits, a friction clutch limiting the movement of the loose rotor element relative to the fixed element, a cam for determining the frictional engagement between the clutch and the loose motor element and acting to apply the clutch when said rotor element turns on the shaft, a fluid pressure device operating for a certain period of time to release the pressure of the clutch against the loose rotor element produced by the cam, after which further movement of the loose rotor element in relation to the shaft will repeat the cycle of operation until the loose rotor element is working in phase with the fixed one.

4. An induction motor with short-circuited secondary comprising one strip-wound stator and a rotor, said rotor consisting of two strip-wound elements one on each side of the stator, both of said rotor elements being provided with short-circuited bars which outside the periphery of the rotor elements are provided with short-circuiting rings and which on the inside of the stator are bent towards the corresponding bars on the other rotor element and connected to each of the corresponding bars of the other rotor element by means of flexible leads in order to make the twisting of one rotor element in relation to the other possible without breaking the electrical connection therebetween.

5. A motor as claimed in claim 4 including copper rings, said rings connecting the inner sides of the bars and being provided with slots, of such depth that a suitable resistance will be obtained between each pair of bars to prevent overloading of the stator when full power is applied thereto.

In testimony whereof I have signed my name unto this specification.

JOHAN WALFRED SWENDSEN.